US011528431B2

(12) United States Patent
Amthor et al.

(10) Patent No.: US 11,528,431 B2
(45) Date of Patent: Dec. 13, 2022

(54) MICROSCOPE AND METHOD FOR PROCESSING MICROSCOPE IMAGES

(71) Applicant: Carl Zeiss Microscopy GmbH, Jena (DE)

(72) Inventors: Manuel Amthor, Jena (DE); Daniel Haase, Zöllnitz (DE)

(73) Assignee: Carl Zeiss Microscopy GmbH, Jena (DE)

( * ) Notice: Subject to any disclaimer, the term of this patent is extended or adjusted under 35 U.S.C. 154(b) by 0 days.

(21) Appl. No.: 16/951,590

(22) Filed: Nov. 18, 2020

(65) Prior Publication Data

US 2021/0160434 A1 May 27, 2021

(30) Foreign Application Priority Data

Nov. 22, 2019 (DE) .......................... 102019131678.2

(51) Int. Cl.
*H04N 5/265* (2006.01)
*G06V 10/22* (2022.01)
*G06V 20/69* (2022.01)

(52) U.S. Cl.
CPC ............. *H04N 5/265* (2013.01); *G06V 10/22* (2022.01); *G06V 20/698* (2022.01)

(58) Field of Classification Search
CPC ....... H04N 5/265; G06V 20/698; G06V 10/22
USPC .......................................................... 348/79
See application file for complete search history.

(56) References Cited

U.S. PATENT DOCUMENTS 10,317,665 B2 6/2019 Milde et al.
10,430,955 B2 * 10/2019 Frise .................. H04N 5/23293
2015/0049180 A1 2/2015 Geibler et al.

FOREIGN PATENT DOCUMENTS

CN 101093280 A 12/2007
CN 104423027 A 3/2015
CN 107076979 A 8/2017
EP 2043005 A1 4/2009

OTHER PUBLICATIONS

Preibisch et al. ("Globally optimal stitching of tiled 3D microscopic image acquisitions", Bioinformatics Applications Note, vol. 25, No. 11, 2009, pp. 1463-1465. (Year: 2009).*
Harth, Amo, Search Report for DE102019131678.2, Aug. 5, 2020, 9 pages (Englsih translation not available).
Gu et al., "A new optimal seam selection method for airborne image stitching", IEEE International Workshop on maging Systems and Techniques, IST 2009, 5 pages.

(Continued)

*Primary Examiner* — Sath V Perungavoor
*Assistant Examiner* — Kristin Dobbs
(74) *Attorney, Agent, or Firm* — LaBatt, LLC

(57) ABSTRACT

A microscope comprises a microscope stand, a camera for recording microscope images and a computing device, which is configured to carry out image processing of the recorded microscope images. The computing device is configured to: define relevant image structures; localize relevant image structures in the microscope images; derive stitching parameters from locations of the relevant image structures; and create a result image with the aid of the microscope images, with the stitching parameters being taken into account. Moreover, a corresponding method is described.

20 Claims, 4 Drawing Sheets

(56) References Cited

OTHER PUBLICATIONS

Szeliski, Richard, "Image Alignment and Stitching: A Tutorial", Foundations and Trends in Computer Graphics and Vision vol. 2, No. 1 (2006) pp. 1-104.
Preibisch, et al., "Globally optimal stitching of tiled 3D microscopic image acquisitions", Bioinformatics Applications Note, vol. 25, No. 11, 2009, pp. 1463-1465.
Chinese Application No. 202011245207.7, Office Action and Search Report, dated Jun. 7, 2022, 11 pages, English translation provided.

* cited by examiner

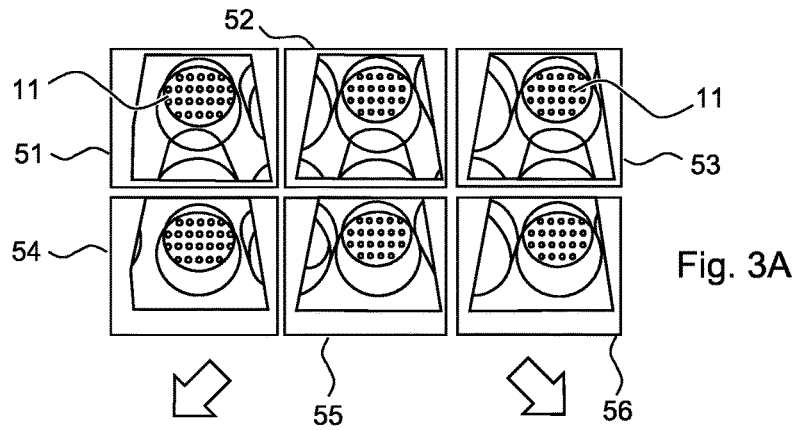
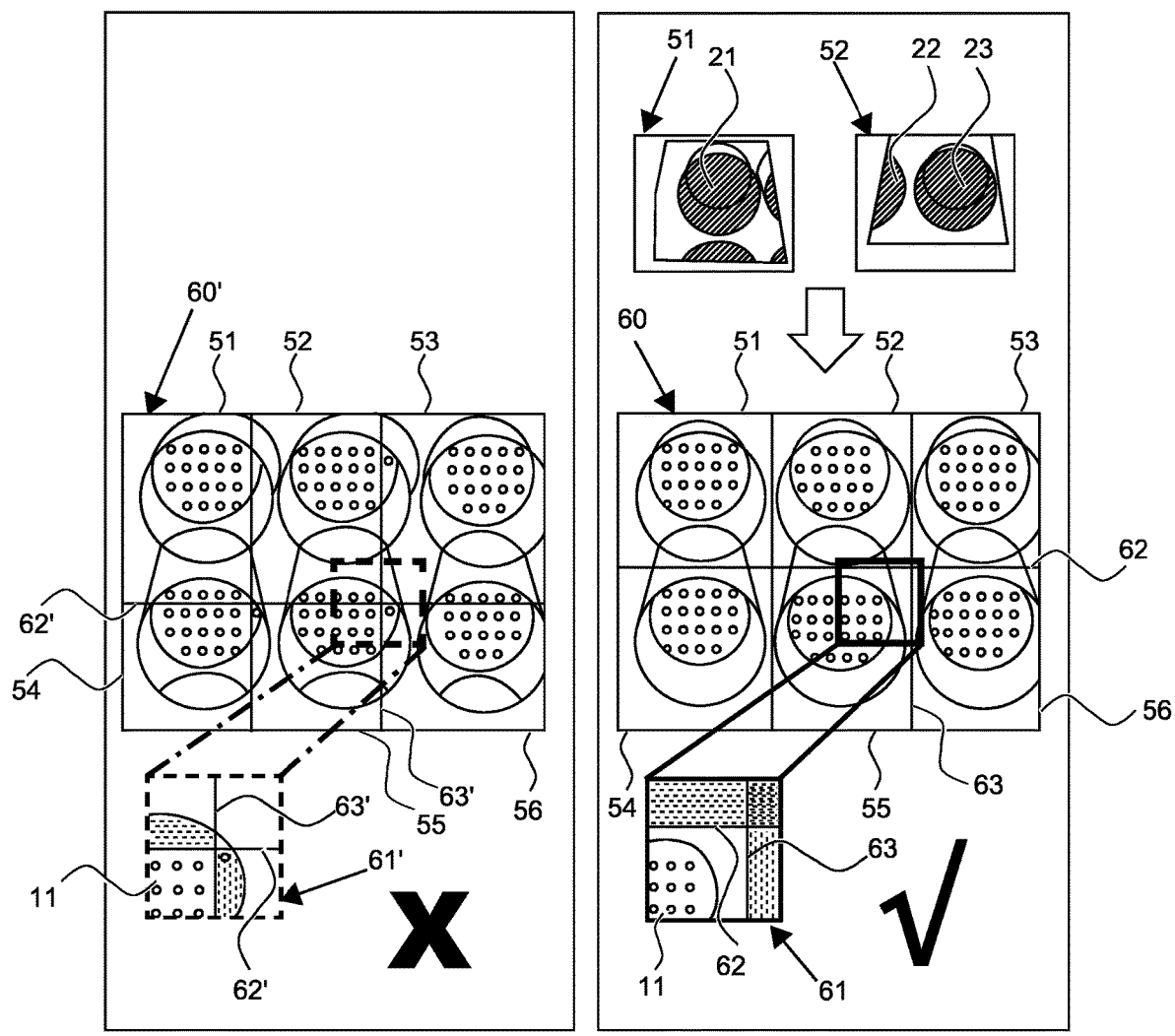
Fig. 3A
Fig. 3B
Fig. 3C

MICROSCOPE AND METHOD FOR PROCESSING MICROSCOPE IMAGES

REFERENCE TO RELATED APPLICATIONS

The current application claims the benefit of German Patent Application No. 10 2019 131 678.2, filed on 22 Nov. 2019, which is hereby incorporated by reference.

FIELD OF THE DISCLOSURE

The present disclosure relates to a microscope and a method for processing microscope images.

BACKGROUND OF THE DISCLOSURE

A generic microscope comprises a microscope stand, a camera for recording microscope images and a computing device, which is configured to carry out image processing of the recorded microscope images.

Recorded microscope images frequently represent partial images, which are stitched to form a result image (image stitching). By way of example, a plurality of microscope images recorded by an overview unit can be stitched to generate an overview image. The microscope images can also be the actual sample images, which are recorded via the microscope objective and which should be stitched to form an overall image of the sample.

By way of example, methods for stitching images are described in the following two articles:
1. Gu, Hua & Yu, Yue & Sun, Weidong: "A new optimal seam selection method for airborne image stitching", IEEE International Workshop on Imaging Systems and Techniques, IST 2009;
2. Szeliski, Richard: "Image Alignment and Stitching: A Tutorial", Foundations and Trends in Computer Graphics and Vision Vol. 2, No 1 (2006).

A main goal in both of these methods is that, where possible, no seam locations where the individual images were brought together should be visible in the result image. The seam locations are therefore defined in such a way that, at said seam locations, there are, where possible, no discontinuities or only small discontinuities in the image content of the individual images. This produces a softer transition between the individual images, which is often not visible to an observer. In this context, the generation of blending between the individual images is also known, and so it is not a sharp seam but a gradual transition between the individual images that arises.

These procedures may lead to problems in the case of microscope images: By way of example, a plurality of microscope images recorded by an overview unit should be stitched to form a result image. By way of example, the microscope images show parts of a multiwell plate with a plurality of wells. Even if the seam locations are chosen in accordance with known methods such that said seam locations are not visible in the result image, there may be perspective differences between the partial images. By way of example, if a circular well is stitched from two or even more partial images, the circular form can be distorted, causing irritation. In respect of the actual sample in the well, bothersome effects may likewise arise from stitching partial images: Thus, colour or brightness differences may be present, which make an assessment by the user or a subsequent image analysis more difficult; in the case of soft transitions as a result of blending, it may be unclear to a user as to whether the sample itself has a colour/brightness profile or whether this is an artefact from image processing.

Consequently, although known methods may supply optically pleasing microscope images, this can lead to problems in respect of an evaluation by a user or an automated image analysis.

An object of the invention can be considered that of specifying a microscope and a method which are able to generate a result image with a particularly high quality from a plurality of microscope images.

SUMMARY OF THE DISCLOSURE

This object is achieved by means of the microscope having the features of claim 1 and by means of the method having the features of claim 3.

Advantageous variants of the microscope according to the invention and of the method according to the invention are subjects of the dependent claims and will additionally be explained in the description that follows.

In the case of the microscope of the aforementioned type, the computing device, according to the invention, is configured to: define relevant image structures; localize relevant image structures in the microscope images; derive stitching parameters from locations of the relevant image structures; and create a result image with the aid of the microscope images, with the stitching parameters being taken into account.

Correspondingly, the method of the invention includes at least the following steps: defining relevant image structures; localizing relevant image structures in the microscope images; deriving stitching parameters from locations of the relevant image structures; and creating a result image with the aid of the microscope images, with the stitching parameters being taken into account.

By way of example, in the example of images of a multiwell plate cited at the outset, the wells can be defined as relevant image structures. The locations of the wells are now identified in the microscope images and the seam locations between the microscope images are chosen in such a way that no seam or as few seams as possible extend through a well. By contrast, there can be more pronounced edges or clearly visible seam locations in the regions between the wells. Presumably, there is no image content here that is relevant to the observer or an automated image analysis, and so cuts, perspective jumps, optical distortions or jumps in brightness in these regions are little bothersome. Overall, the seam locations may possibly be more apparent here than in the known methods; however, the seam locations in the invention do not extend (or only extend as little as possible) through relevant, identified regions.

The stitching parameters can determine the definition of seam locations between the microscope images, along which the microscope images are stitched to create the result image. By way of example, the stitching parameters can describe that a seam location should not extend through certain found relevant image structures where possible; wherein, alternatively, certain image structures can also be identified, through which a seam location is precisely allowed. In this respect, a "relevant image structure" should be considered to be relevant in respect of defining the seam location and not necessarily relevant within the meaning of the presentation of a microscopic sample to be examined. Here, stitching parameters can be used as context information items in the case of stitching methods known per se. In known stitching methods the direct image content, independently of the meaning thereof, is usually used as the optimization criterion for determining seam locations which bring about a transition that is as soft as possible. By contrast, a stitching parameter allows an optimization criterion to be added, according to which no seam location (or at most one seam location) should extend through a localized relevant image structure. As a consequence, a relevant structure that extends to the edge of a microscope image and hence is clipped by the edge is preferably not taken from this microscope image but from an adjacent microscope image, where the same relevant image structure is contained in full.

The stitching parameters can also be used to determine blending at seam locations along which the microscope images are stitched to create the result image. By way of example, the width of the blending (number of image pixels) can be set on the basis of localized relevant image structures. In particular, the stitching parameters can specify or influence how blending should be implemented at a seam location next to a relevant image structure so that the blending region does not overlap with the relevant image structure. Consequently, a smooth transition with the information items of interest is avoided. Conversely, provision can also be made for a blending region to be located within an identified image structure and not to protrude from the latter.

The localization of relevant image structures can be implemented by a segmentation which generates a binary mask. For each image pixel the binary mask specifies whether or not said pixel is part of a relevant structure. In particular, the stitching parameters can represent a set of instructions as to how to take account of such a binary mask for stitching the images.

Instead of a binary mask, a soft decision can also be made for each pixel: A numerical value assigned to the pixel then specifies the acceptability of a seam location at this image pixel. Such a mask of numerical values is subsequently used in an optimization task, which defines the profile of the seam locations. Instead of a pixel-by-pixel decision, it is also possible to create a list of regions which need not or preferably must originate from the same microscope image during stitching.

By defining and localizing relevant image structures, semantics (meaning) of the found image structures are taken into account when stitching the microscope images. Only edges, for example, are identified conventionally, without however semantics being ascertained in respect of the object to which these edges belong. By contrast, determining the semantics in variants of the invention offers a basis for a decision whether a contiguous region which should not be intersected by a seam location (even if the seam location were invisible) is present or whether no relevant image region is present, in which edges consequently may have a jump or kink as a result of stitching.

Optionally, whether a microscope control instruction for renewed recording of one or more microscope images with altered microscope settings is generated and output can also be determined from the stitching parameters. In this case, recorded microscope images are optionally only subsequently stitched to form a result image. The altered microscope settings can bring about, in particular, a different relative lateral position of the microscope images and consequently a different relative position of seam locations. As a result, a relevant image structure can originate from one microscope image only and need not be stitched together. By way of example, renewed recording of images with altered microscope settings can be implemented if a found image structure (or a specified number of found relevant image structures) cannot be transferred into the result image from a single recorded microscope image (in each case), but would have to be stitched together from a plurality of microscope images.

In the case where a relevant image structure cannot be transferred seamlessly from a single microscope image because there is no individual image containing the entire image structure, it is consequently possible, in particular, to provide for the relative position of the relevant image structures to be used to derive how new microscope images can be recorded in order to rectify this.

In particular, the altered microscope settings can specify altered sample stage positions for renewed recording of the microscope images. In this case, the number of stage positions for the individual images can also differ from the previously used number of stage positions. Consequently, the altered microscope settings can change, in particular increase, an overlap between adjacent microscope images. In principle, a zoom setting can also be altered such that, for example, a relevant image structure whose dimensions are greater than the field of view of an individual microscope image can be recorded in a single microscope image when there is renewed image recording.

Relevant image structures may differ depending on the application and, in particular, be one or more of the following: multiwell wells (if the individual images represent parts of a multiwell plate); sample vessels, sample vessel labels, e.g. column and row specification or well numbers next to multiwell wells; coverslips when recording an image of an object carrier; markings, e.g. stickers with or without labelling or barcode regions. This ensures that the entire region originates from the same microscope image in the case of a barcode; by contrast, in the case of conventional stitching by finding edges, a seam could also extend between the bars of a barcode, as a result of which there may be a soft image transition but there could be an incorrect image analysis on account of perspective differences. Relevant image structures can also be the actual sample region, e.g. a tissue section, in contrast to an image background. Relevant image structures can also be light reflections, masks or shadows—if a seam location extends through reflection or shadow there would be a hard edge, which could irritate a user and leave them uncertain as to whether a special object could be present there or whether this purely is an image processing artefact. Should the microscope images not be images of an overview unit, relevant image structures can also be a cell nucleus or other cell constituents.

Defining and localizing relevant image structures and deriving stitching parameters can also be implemented as a common process. By way of example, an image processing algorithm can be designed to calculate imaging on seam locations directly from microscope images, for the purposes of which the algorithm was taught, in particular in advance, using microscope images. Therefore, localizing relevant structures does not necessarily mean that an image or a list of found relevant structures needs to be output; rather, it is enough for this information to be used further for deriving the stitching parameters. Deep learning methods (machine learning, deep learning) lend themselves to the image analysis; however, any other computing method able to localize the relevant structures in the microscope images can also be used.

As a rule, a position of the individual images in relation to one another is known, for example as a result of calibrating an overview unit (overview camera) relative to a displaceable sample stage. Thus, as a rule, these images are not displaced relative to one another to stitch the microscope images; instead, the intended location of the seam location is defined within an overlap region between two microscope images. However, in the case of an incorrect calibration of the overview unit or in the case of an incorrect registration of the microscope images, the latter do not fit correctly to one another. If labels or barcodes are situated in such regions, they cannot be evaluated correctly. What identifying relevant image structures and defining seam locations on the basis thereof achieves is that there are no substantial negative consequences, even in the case of an imprecise calibration, as a result of which jumps at seam locations between individual images are unavoidable.

Optionally, relevant image structures of different semantics can be defined and localized. Now, the stitching parameters are derived not only on the basis of the locations of relevant image structures but also on the basis of the semantics of these image structures. In the case where the stitching of microscope images requires a seam location to extend through one of a plurality of relevant image structures, the semantics can specify a hierarchy, according to which a decision is made as to the relevant image structures through which the seam location is set. By way of example, reflections or masks should be more likely to be intersected by a seam than wells or coverslip (edges). It may also be the case that a seam must extend either through a multiwell well or through a label next to the latter. In this case, the hierarchy can be defined differently, depending on application. Thus, it may be preferable for a seam to rather extend through the well than through the label to ensure that an automatic image analysis correctly processes the information of the label belonging to the well. However, in the case of simple column or row numbers, a seam through the label may also be preferred over a seam through the well since the column or row number can also be derived from adjacent numbers.

An input tool allowing a user to define relevant image structures may optionally be provided. In a simple example, this relates to a selection from a list of objects, e.g. multiwell wells, coverslip (edges), etc. Alternatively, the input tool may allow a user to plot markings in one or more of the microscope images or in other example microscope images (which are subsequently not stitched to form a result image). Here, relevant image structures can be localized in part by the markings made by the user; then, further relevant image structures are automatically localized by way of image processing software in further microscope images on the basis of the markings of the user in other microscope images. By way of example, if a user plots a circle around a multiwell well, (circular) multiwell wells are automatically recognized in other microscope images. Should a user also mark a label next to a well, labels are also sought after in other microscope images as relevant image structures. Markings in microscope images brought about by way of the input tool can also be used within the scope of a learning process of a machine learning algorithm to define or learn the relevant image structures. By way of example, a user can use the input tool to mark well numbers of a multiwell plate in one or more microscope images, whereupon the machine learning algorithm learns, within the scope of a training step, that the image regions which contain well numbers should always be localized as relevant structures in future microscope images.

As an alternative or in addition to the option of a user being able to define relevant image structures themselves, this can also be implemented in automated fashion with the aid of image processing software. Thus, an image analysis enables classification of the microscope images, wherein the relevant image structures sought after in the microscope images are defined automatically on the basis of the result of the classification. By way of example, should the presence of a multiwell plate be identified, circular wells and, optionally, labels, in particular numbering arranged in rows and columns, are searched for automatically as relevant image structures. By contrast, should the presence of an object carrier with coverslip be identified, the region of the coverslip edges can be defined as relevant image structure, and/or a sample region located laterally within the coverslip region.

Localization of relevant image structures can be implemented by an image analysis of the microscope images, which is carried out by image processing software. However, as an alternative or in addition thereto, the locations in the microscope images at which multiwell wells should be situated can also be ascertained from a multiwell plate position and type, which are known in advance. By way of example, a position of a multiwell plate can be specified by a stop on the sample stage. If the type of multiwell plate is known, the positions of the individual wells are also known relative to the optical system. Should the microscope images be images of an overview unit, the overview unit is, as a rule, also calibrated relative to the sample stage. Therefore, the information about the type of placed multiwell plate can be used (on its own or in combination with an image analysis) to identify the locations of relevant image structures. As further option, the locations, or some of the locations, can also be plotted manually by a user.

A marking tool can also allow a user to mark image structures in a calculated result image, a new microscope image of said image structures subsequently being recorded and being used to calculate an updated result image. Here, microscope settings for the new microscope image are chosen in such a way that the image structure marked by the user can be recorded in a single microscope image.

Optionally, provision can also be made for an alert in respect of a seam location to be output to a user should the relative position of this seam location lead to image artefacts being expected. By way of example, this is the case if the images of a sample carrier to be stitched together were recorded in such a way that a seam must necessarily extend through a sample vessel. By way of example, the alert can be indicated in or on the result image. Instead of an output to a user, the alert can also be output to an electronic control or evaluation device, which can be part of the computing device or which can be present in addition to the latter. The control or evaluation device can be configured to carry out more in-depth image processing of the result image or of the microscope images or else to initiate a microscope control when an alert is received, in particular in order to record further microscope images with altered microscope settings, said further microscope images subsequently being incorporated in the result image to be created.

A microscopy method according to the invention includes the steps of initially recording a plurality of overlapping microscope images and of subsequently processing these in the manner described above. It is optionally determined whether the recorded microscope images are suitable for creating the result image or whether it is necessary to first record one or more further microscope images, which are then used to calculate the result image. Here, a further recorded microscope image can replace a previously recorded microscope image. These two microscope images can differ in that they are offset from, but overlap, one another, as a result of which seam locations with respect to the other microscope images can extend at different locations.

The microscope can comprise one or more cameras. In particular, the camera used to record the aforementioned microscope images can be a camera onto which detection light is guided via a microscope objective. An overview objective can also be used in this context. Alternatively, the camera can belong to an overview unit which is present in addition to the microscope objective and the camera downstream of the latter. In principle, the camera can also consist of a plurality of camera units, which record microscope images from the same direction or from different directions, which microscope images should subsequently be stitched.

The terms used are explained in more detail below.

The microscope can be designed as a light microscope or else record sample images in a different way. By way of example, it might be designed as an x-ray microscope or AFM (atomic force microscope), wherein the microscope images discussed here originate from an overview unit measuring light in this case. Light is intended to comprise the visible spectrum or else IR or UV light.

The microscope stand denotes a holding apparatus for microscope components or optical components, in particular lenses or mirrors, and comprises a sample holder. In particular, the latter can be designed as a sample stage displaceable in motor-driven fashion. To record the various microscope images, the sample stage can be displaced in automated fashion.

The computing device configured to carry out image processing of the recorded microscope images can be designed by a computer situated at the microscope or, alternatively or in part, by a server or computer located at a distance. The various image analyses and microscope controls described herein can be implemented by the computing device. Software required to this end can be stored in the computing device.

The microscope images are also referred to as individual images or raw images, to clarify that an overall image, which is referred to as result image, should be calculated therefrom. The microscope images are laterally offset from one another, with parts overlapping one another so that there is a freedom in respect of defining a seam. It is sufficient for some of the microscope images to be incorporated in the result image. In particular, the microscope images can be recorded with so much overlap that not every microscope image is required to allow a gap-free result image to be stitched. In these cases, a lateral offset between adjacent microscope images is less than half of the field of view. Expressed differently, the lateral increment between two microscope images can be less than half of the sample region recorded in this direction.

Seam or seam location denotes image regions where two (or, in principle, more than two) microscope images are stitched. Therefore, a seam can be a line of any shape, with a blending region being able to be formed transversely or perpendicular to the line.

Relevant image structures can be considered to be the image regions of objects which should be identified in the microscope images. The computing device or method variants can be designed to also identify only image parts of such objects, for example a part of a well which is not imaged in full in a microscope image. The localization of relevant image structures can be understood to mean that spatial specifications in respect of the relevant image structures or parts of relevant image structures are ascertained within the microscope images, in particular by image processing software.

The properties described as additional microscope features also yield variants of the method according to the invention when used as intended. Conversely, the microscope, in particular the computing device thereof, can also be configured to carry out the described method variants.

BRIEF DESCRIPTION OF THE DRAWINGS

A better understanding of the invention and various other features and advantages of the present invention will become readily apparent by the following description in connection with the schematic drawings, which are shown by way of example only, and not limitation, wherein like reference numerals may refer to alike or substantially alike components:

FIGS. 3A-3C are schematic diagrams for elucidating the image processing in the prior art and in exemplary embodiments of the invention.

DETAILED DESCRIPTION OF EMBODIMENTS

Figure 1:
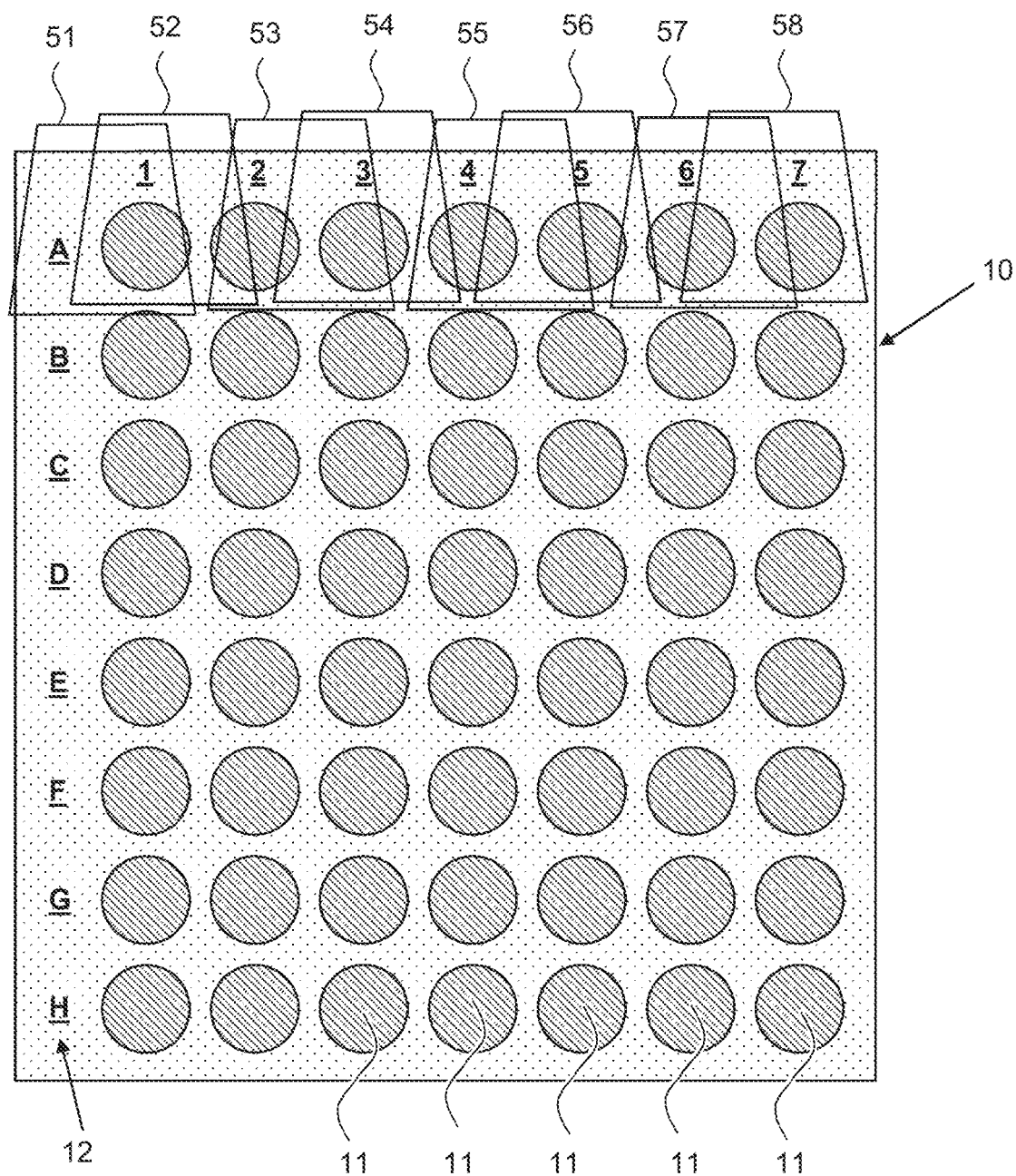
FIG. 1 is a schematic illustration of a multiwell plate for explaining aspects of the invention.

FIG. 1 schematically shows an object, a multiwell plate 10 here in exemplary fashion, which is intended to be examined by a microscope. The multiwell plate 10 comprises a plurality of wells 11, in each of which a sample to be examined can be arranged. Labels 12 on the multiwell plate 10 can comprise, inter alia, column labels 1-7 and row labels A-H.

The microscope is used to record a plurality of microscope images 51-58, which are also referred to as individual images and which should be stitched to form an overall image. The microscope images 51-58 are laterally offset from one another and can be either overview images or sample images, which are recorded with a greater magnification than the overview images.

In the plotted example, the microscope images 51-58 originate from an overview unit. The latter is at an angle to an optical axis of the microscope objective and hence at an angle to a surface normal of the multiwell plate 10. As a result, the captured region of any one of the microscope images 51-58 is distorted accordingly, as indicated in FIG. 1.

It is a challenge to stitch the microscope images 51-58 to form an overall image (result image) such that, where possible, no defects or irritating image regions arise for an observation by a user or for further automatic image processing on account of the stitching.

Figure 2:
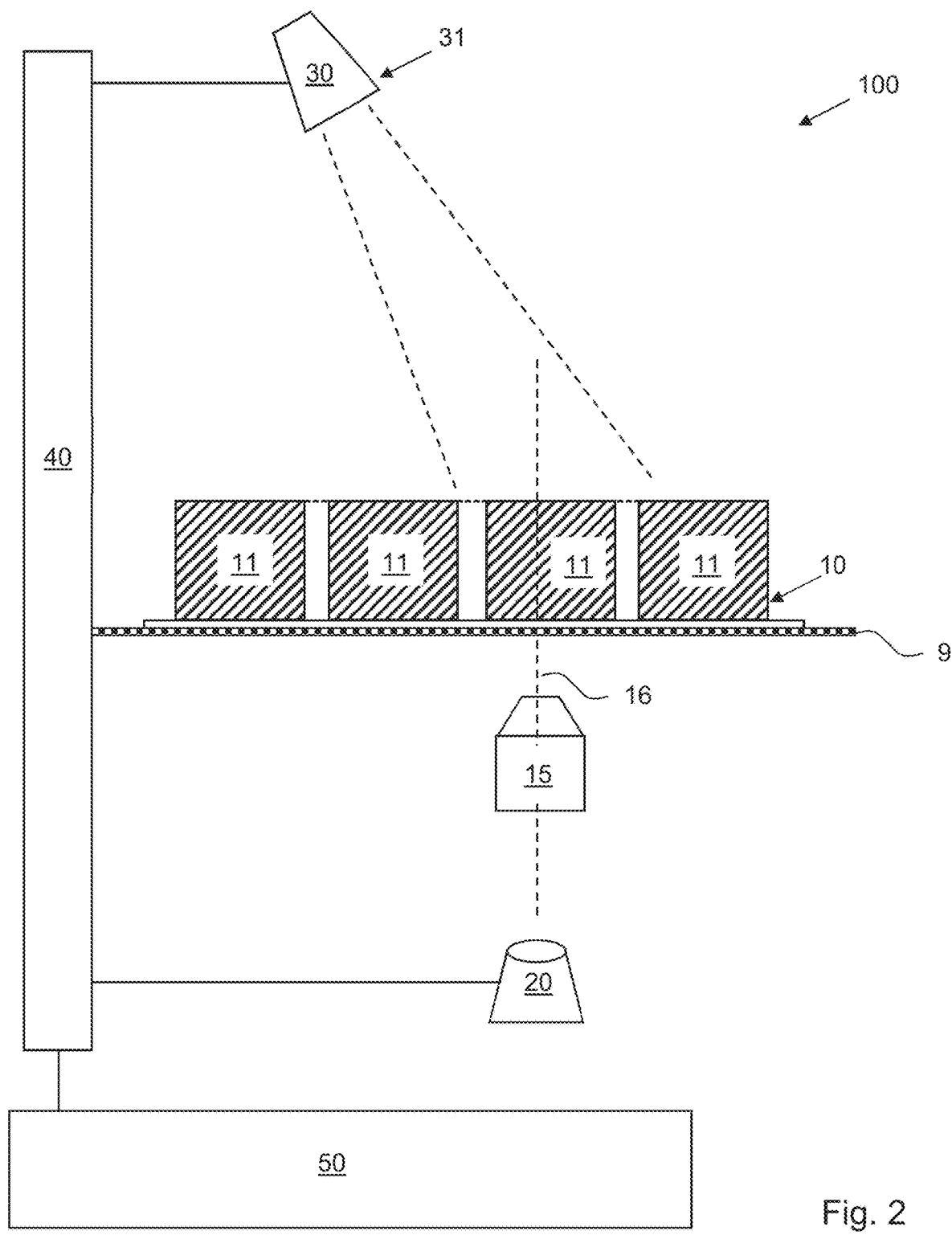
FIG. 2 shows an exemplary embodiment of a microscope according to the invention.

Before this is discussed in more detail, a microscope 100 according to the invention is initially explained with reference to FIG. 2. The microscope 100 comprises a microscope stand 40 which is used to hold other microscope components, in particular at least a microscope objective 15 and a camera 20. Detection light emanating from a sample is guided via the microscope objective 15 to the camera 20. Moreover, the microscope 100 comprises a further camera 30, which is part of an overview unit 31. The field of view of the camera 30 of the overview unit 31 is greater than a field of view of the camera 20 via the microscope objective 15. As illustrated, a measuring direction of the camera 30 can be at an angle to an optical axis 16 of the objective 15.

The microscope 100 comprises a sample stage 9, on which an object to be examined should be positioned, a multiwell plate 10 with a plurality of wells 11 in the illustrated example. In the example shown, the cameras 20 and 30 are situated on opposite sides of the object to be examined. However, alternatively, both cameras 20 and 30 can also be arranged on the same side of the object to be examined; in respect of FIG. 2, this would mean that both cameras 20 and 30 are arranged above the sample stage 9 or that both cameras 20 and 30 are arranged below the sample stage 9.

The camera 20 and/or the camera 30 records a plurality of microscope images, which should be stitched by a computing device 50 to form a result image.

In this context, the type of image recording can be as desired as a matter of principle. In particular, this can be laterally offset wide field images or else microscope images which were each recorded using a scanning motion. The microscope images that should be stitched can also be recorded by different camera chips. Thus, the camera 30 may also comprise a plurality of camera units (not shown), which are directed at the object to be examined from the same angle or from different angles.

Stitching of the microscope images 51-58 is now described in more detail with reference to FIGS. 3A-3C.

FIG. 3A shows a plurality of microscope images 51-56, in each of which a section of the object to be examined is recorded. In this example, each microscope image 51-56 shows parts of wells 11 of a multiwell plate, wherein, depending on the microscope image 51-56, a plurality of parts of different wells 11 and/or an entire well 11 have been recorded. This is only one example and other objects without multiwell plate can also be examined.

Initially, stitching of the microscope images 51-56 not in accordance with the invention is described with reference to FIG. 3B. The microscope images 51-56 are stitched along seam locations 62' and 63' to form a result image 60'. If the relative position of the microscope images 51-56 with respect to one another is correct, no image content gaps or repeat representations of image structures arise in the result image 60' at the seam locations 62' and 63'. A section 61' of the result image 60' is illustrated in magnified fashion: In this section 61', four microscope images 52, 53, 55, 56 are stitched along the seam locations 62' and 63'. Often, the brightness levels differ in the microscope images, as a result of which brightness jumps arise at the seam locations 62' and 63'; this is schematically elucidated in the section 61' by different hatchings. The brightness jumps at these seam locations 62' and 63' extend within a well 11. For a user, this can be a cause of irritation or make an evaluation more difficult. If automatic image processing is intended to be used, incorrect results may arise in these relevant image parts.

To overcome these disadvantages, the seam locations are placed in a special way according to the invention. FIG. 3C schematically shows that image content is initially recognized or classified in an image processing step preceding a stitching of the microscope images 51-56. In the process, relevant image structures 21-23 are searched for in the microscope images 51-56 and the locations thereof are registered. In the present example, it may be specified that the wells 11 of a multiwell plate should be searched for as relevant image structures. The computing device of the microscope carries out an image processing algorithm, which is configured to identify specifiable relevant image structures (e.g. wells or image sections of wells) in the microscope images 51-56. In particular, the image processing algorithm can comprise a machine learning algorithm, which was trained to identify specified relevant image structures. In the illustrated example, the relevant images structures 21 and 23, which are completely contained in respectively one of the microscope images 51-56, were localized among others; additionally, a relevant image structure 22, which is clipped at the edge of the corresponding microscope image 52, was also recognized.

The computing device of the microscope now derives stitching parameters from the location information of the relevant image structures, said stitching parameters subsequently influencing the seam locations to be defined. By way of example, the stitching parameters can specify that a seam location must not extend through a relevant image structure or that penalty points are linked to a seam location extending through the relevant image structure. The mathematical description of the stitching parameters depends on the calculation algorithms according to which the seam locations are placed.

FIG. 3C furthermore shows a result image 60, in which the seam locations 62, 63 have been placed according to the invention between the individual microscope images 51-56. In this case, no seam location 62, 63 extends through one of the wells 11, as also shown in the magnified section 61 of the result image 60. Although, like in the prior art, brightness jumps may (optionally) be present at the seam locations between the individual microscope images 51-56, the magnified section 61 shows that these brightness jumps do not arise in or directly at the relevant image structures (wells 11) but instead arise in less important image parts between the wells.

As a result, a user finds a visual sample assessment in the result image 60 easier and/or the risk of incorrect processing of the image portions of interest is lower for optional further image processing steps.

The stitching parameters can also influence blending at the seam locations. For example, the stitching parameters can influence the width of a blending region perpendicular to the profile of a seam. In the blending region, a pixel value (brightness value) for the result image 60 is calculated/ averaged from the two pixel values of two overlapping microscope images. The width of the blending region is chosen such that a blending region does not overlap a localized relevant image structure 21-23. As a result of this, blending regions along the seam locations 62, 63 can have different widths, in particular: If a seam extends further away from relevant image structures, then the blending region can be chosen to be larger such that a soft brightness profile arises; by contrast, the blending region is narrower in the case of a seam extending close to a relevant image structure, as a result of which a brightness jump may be conspicuous in the result image but a soft transition falsifying the image region of a relevant image structure is reliably precluded.

Figure 4:
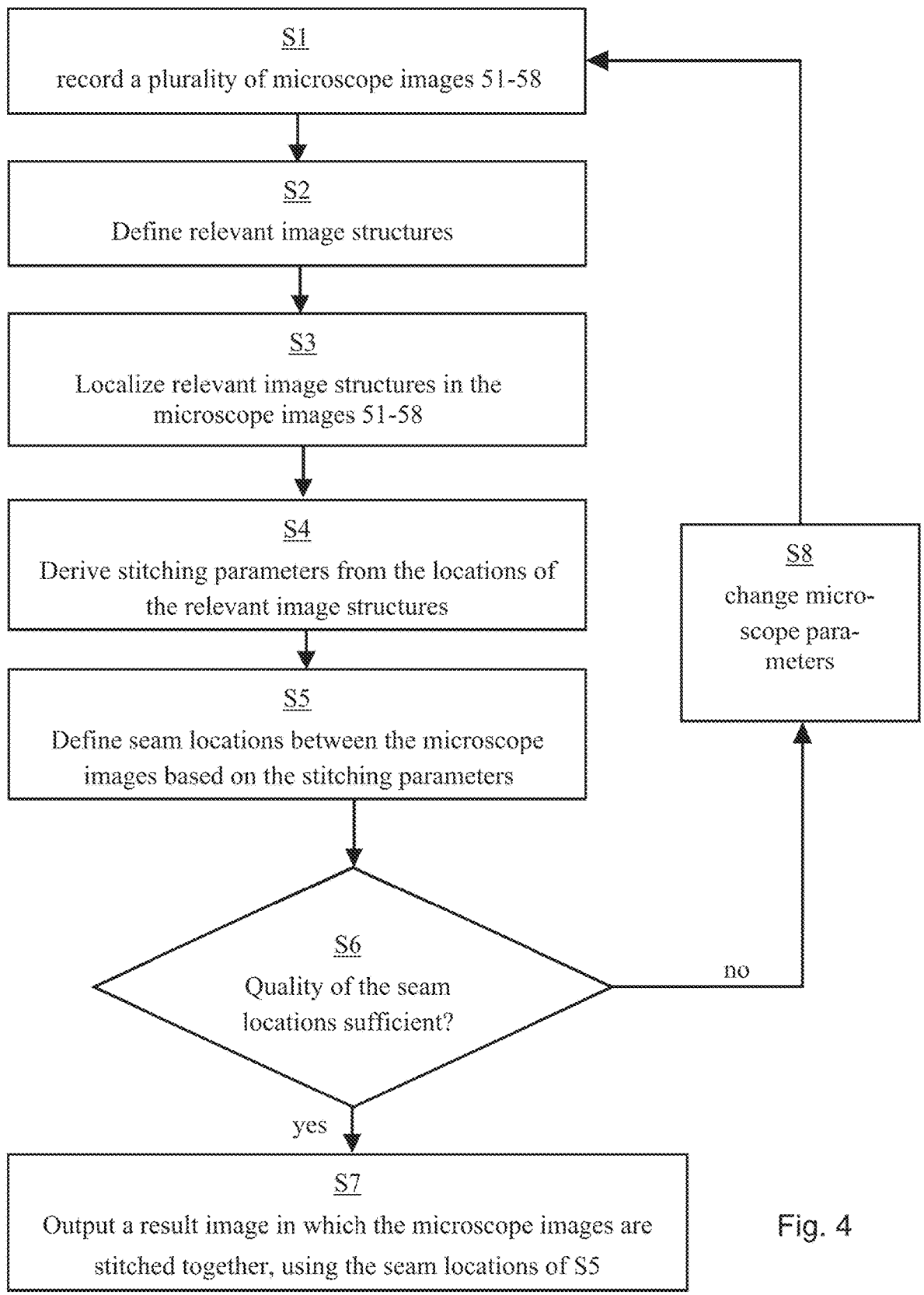
FIG. 4 is a flowchart of an exemplary embodiment of the method of the invention.

The processes described above form exemplary embodiments of the method according to the invention. Moreover, an exemplary embodiment of a microscopy method according to the invention is described with reference to the flowchart in FIG. 4; the computing device of the microscope can also be configured to carry this out.

A plurality of overlapping microscope images 51-58 are recorded in step S1. To this end, a sample stage can be laterally displaced between the individual image recordings, for example.

Relevant image structures are defined in step S2. By way of example, this can be implemented by virtue of a user making a selection from specified objects of a list. Alternatively, the definition can also be implemented automatically by the computing device on the basis of information about the object. By way of example, should it be known that one or more multiwell plates are examined, the computing device can automatically define "wells" as relevant image structures. By way of example, labels and reflections can be further relevant image structures: Although reflections usually do not correspond to a sample structure of interest, a seam location through a reflection would bring about a drastic brightness jump in the result image. As a result, it could be unclear to a user whether this is purely an image artefact or whether there is a physical problem with the sample, for example.

In the subsequent step S3, relevant image structures are sought after in all microscope images and the locations of found relevant image structures are noted. Optionally, semantics of relevant image structures can also be captured; that is to say, the type of relevant image structure is also stored (well, reflection, multiwell plate label, etc.).

Stitching parameters from the ascertained locations of the relevant image structures are determined in step S4. By way of example, as stitching parameter, a value specifying whether or not the corresponding image pixel is located within a relevant image structure can be assigned to each image pixel of a microscope image. The value can be a binary value (yes/no) or a more finely graduated value if image structure semantics are to be taken into account.

Subsequently, seam locations are defined between the microscope images 51-58 in step S5, for the purposes of which the stitching parameters are taken into account. The seam locations are placed such that, where possible, a seam never extends through or directly at the edge of a localized relevant image structure. If a relevant image structure extends up to the edge of a microscope image and was, as a result, clipped by the edge of this microscope image, then this clipped relevant image structure is not adopted in the result image where possible. Rather, the seam is placed such that this relevant image structure is adopted in the result image from an adjacent, overlapping microscope image provided said relevant image structure is completely contained in this adjacent microscope image, i.e., in particular, it does not extend up to the edge of this microscope image.

A relative position of the microscope images with respect to one another may be known or specified. However, alternatively, the recorded microscope images can also be displaced relative to one another before they are stitched in step S5. A displacement of microscope images with respect to one another can be implemented, in particular, with the aid of the localized relevant image structures. If part of a relevant image structure is present in two overlapping microscope images, these can be displaced with respect to one another in such a way that the localized part of the relevant image structure is overlaid in the two microscope images. Such a displacement of the microscope images can be supplemented, in particular following step S3 or S4.

In optional step S6, a decision is made as to whether the seam locations could be placed in a satisfactory manner. By way of example, penalty points could be noted if a seam location must be placed through a relevant image structure because this image structure is not contained in full (unclipped) in any one of the recorded microscope images. By way of example, in the example of FIG. 1, there is no microscope image 51-58 in which the well from column 2, row A is contained in full. Therefore, using these microscope images 51-58, the well from column 2, row A must necessarily be stitched from two microscope images 52, 53, for which penalty points may be noted. If the penalty points are below a specified threshold value, a transition is made to step S7.

A result image formed with seam locations from step S5 is output in step S7. Without optional step S6, step S7 immediately follows S5.

If the penalty points exceed the specified threshold value in optional step S6, step S8 follows. Therein, microscope parameters/microscope settings which influence the brightness and/or relative position of recordable microscope images are altered. By way of example, the microscope parameters specify sample stage positions to be approached in succession, in such a way that recordable microscope images differ in terms of their lateral position from the microscope images already recorded. As a result, seam locations can be placed differently and it is possible to avoid a seam location extending through a relevant image structure. Step S8 is followed in turn by step S1, in which further microscope images are recorded using the microscope parameters from S8. Ideally, when step S6 is carried out again, the number of penalty points should now be lower such that the threshold value is no longer exceeded and a result image can be output.

In further variants, certain relevant image structures can also precisely specify image regions through which a seam should extend.

In one embodiment of the method according to the invention for processing microscope images, at least steps S2-S5 and S7 are carried out, which may also be implemented on a computer spatially separated from a microscope.

In any case, the embodiments of the invention can be used to generate result images, in which seam locations extend at suitable locations so that an evaluation by a user and/or further image processing is simplified.

LIST OF REFERENCE SIGNS

A-H Row labels of the multiwell plate 10
S1-S8 Steps of method variants
1-7 Column labels of the multiwell plate 10
9 Sample stage
10 Multiwell plate
11 Wells of the multiwell plate 10
12 Labels of the multiwell plate 10
21-23 Relevant image structures
15 Objective
16 Optical axis of the objective 15
20 Camera (microscope camera)
30 Camera of the overview unit 31
31 Overview unit
40 Microscope stand
50 Computing device
51-58 Microscope images
60 Result image
60' Result image (not according to the invention)
61 Magnified section of the result image 60
61' Magnified section of the result image 60'
62, 63 Seam locations when stitching the microscope images
62', 63' Seam locations in the result image 60'
100 Microscope

We claim:

1. A microscope comprising:
   a microscope stand, a camera for recording overlapping microscope images and a computing device, which is configured to carry out image processing of the recorded overlapping microscope images,
   wherein the computing device is configured to:
   define relevant image structures;
   localize relevant image structures in the overlapping microscope images;
   derive stitching parameters from locations of the relevant image structures; and
   create a result image based on the overlapping microscope images, with the stitching parameters being taken into account, wherein the stitching parameters determine a seam location within overlapping regions of the overlapping microscope images for stitching the overlapping microscope images together, and wherein the stitching parameters describe that a seam location should or should not extend through localized relevant image structures.

2. The microscope as defined in claim 1,
wherein the camera is part of an overview unit configured for recording the microscope images.

3. A method for processing microscope images, the method including:
defining relevant image structures;
localizing relevant image structures in the microscope images;
deriving stitching parameters from locations of the relevant image structures; and
creating a result image based on the microscope images, with the stitching parameters being taken into account, wherein seam locations at which the microscope images are stitched together are chosen such that no seam or as few seams as possible extend through the relevant image structures.

4. The method as defined in claim 3,
wherein the stitching parameters determine how seam locations between the microscope images are set.

5. The method as defined in claim 3,
wherein the stitching parameters describe a blending at seam locations, along which the microscope images are stitched to create the result image.

6. The method as defined in claim 3, further comprising
using the stitching parameters to determine whether to output a microscope control instruction for renewed recording of microscope images with altered microscope settings, before recorded microscope images are stitched to form a result image.

7. The method as defined in claim 6,
wherein the altered microscope settings specify altered sample stage positions for renewed recording of the microscope images.

8. The method as defined in claim 3,
wherein the relevant image structures are one or more of the following:
multiwell wells, sample vessels, sample vessel labels, coverslips, markings, light reflections, maskings or shadows.

9. The method as defined in claim 3,
wherein relevant image structures of different semantics are defined and localized;
wherein the stitching parameters are derived not only on the basis of the locations of relevant image structures but also on the basis of the semantics of these image structures; and
wherein, in the case where the stitching of microscope images requires a seam location to extend through one of a plurality of relevant image structures, the semantics specify a hierarchy, according to which a decision is made as to the relevant image structures through which the seam location is set.

10. The method as defined in claim 3, further comprising
providing an input tool, by means of which a user can define relevant image structures by drawing markings in some of the microscope images or in example microscope images.

11. The method as defined in claim 3, further comprising
carrying out an image analysis for classification of the microscope images,
wherein the relevant image structures sought after in the microscope images are defined automatically on the basis of the classification.

12. The method as defined in claim 3,
wherein the localizing of relevant image structures is effected by determining at which locations in the microscope images multiwell wells should be situated, based on a known multiwell plate position and type.

13. The method as defined in claim 3, further comprising
establishing whether a seam location extends through one of the relevant image structures in the result image and, should this be the case, outputting an alert in respect of the seam location to a user or to an electronic control or evaluation device.

14. A microscopy method, including:
recording a plurality of overlapping microscope images;
carrying out the method as defined in claim 3 for processing the microscope images; and
determining whether the recorded microscope images are suitable for creating the result image or whether it is necessary to first record one or more further microscope images, which are then used to calculate the result image.

15. A method for processing microscope images, including:
defining relevant image structures;
localizing relevant image structures in the microscope images;
deriving stitching parameters from locations of the relevant image structures;
creating a result image based on the microscope images, with the stitching parameters being taken into account; and
establishing whether a seam location extends through one of the relevant image structures in the result image and, should this be the case, outputting an alert in respect of the seam location to a user or to an electronic control or evaluation device.

16. The method as defined in claim 15,
wherein relevant image structures of different semantics are defined and localized;
wherein the stitching parameters are derived not only on the basis of the locations of relevant image structures but also on the basis of the semantics of these image structures; and
wherein, in the case where the stitching of microscope images requires a seam location to extend through one of a plurality of relevant image structures, the semantics specify a hierarchy, according to which a decision is made as to the relevant image structures through which the seam location is set.

17. The method as defined in claim 15, further comprising
wherein the localizing of relevant image structures is effected by determining at which locations in the microscope images multiwell wells should be situated, based on a known multiwell plate position and type.

18. The microscope as defined in claim 1,
wherein relevant image structures of different semantics are defined and localized;
wherein the stitching parameters are derived not only on the basis of the locations of relevant image structures but also on the basis of the semantics of these image structures; and
wherein, in the case where the stitching of overlapping microscope images requires a seam location to extend through one of a plurality of relevant image structures, the semantics specify a hierarchy, according to which a decision is made as to the relevant image structures through which the seam location is set.

19. The microscope as defined in claim 1,
wherein the localizing of relevant image structures is effected by determining at which locations in the overlapping microscope images multiwell wells should be situated, based on a known multiwell plate position and type.

20. The microscope as defined in claim 1, wherein the computing device is further configured to:
establish whether a seam location extends through one of the relevant image structures in the result image and, should this be the case, outputting an alert in respect of the seam location to a user or to an electronic control or evaluation device.

* * * * *